United States Patent
Chen et al.

(10) Patent No.: US 11,193,087 B2
(45) Date of Patent: Dec. 7, 2021

(54) SURFACTANT COMPOSITION

(71) Applicant: Croda, Inc., Edison, NJ (US)

(72) Inventors: Xin Chen, Hockessin, DE (US); Min Ma Wang, Cypress, TX (US); Kevin Wade Penfield, Wilmington, DE (US)

(73) Assignee: Croda, Inc., Plainsboro, NJ (US)

( * ) Notice: Subject to any disclaimer, the term of this patent is extended or adjusted under 35 U.S.C. 154(b) by 183 days.

(21) Appl. No.: 16/480,701

(22) PCT Filed: Jan. 8, 2018

(86) PCT No.: PCT/US2018/012751
§ 371 (c)(1),
(2) Date: Jul. 25, 2019

(87) PCT Pub. No.: WO2018/140215
PCT Pub. Date: Aug. 2, 2018

(65) Prior Publication Data
US 2020/0157470 A1    May 21, 2020

Related U.S. Application Data

(60) Provisional application No. 62/451,283, filed on Jan. 27, 2017.

(51) Int. Cl.
| | | |
|---|---|---|
| *C11D 1/825* | (2006.01) | |
| *B01D 17/04* | (2006.01) | |
| *C11B 13/00* | (2006.01) | |

(52) U.S. Cl.
CPC .............. *C11D 1/825* (2013.01); *B01D 17/04* (2013.01); *C11B 13/00* (2013.01)

(58) Field of Classification Search
CPC .......... C11B 13/00; C11D 1/825; B01D 17/04
See application file for complete search history.

(56) References Cited

U.S. PATENT DOCUMENTS

| | | | | |
|---|---|---|---|---|
| 5,874,017 A | * | 2/1999 | Palmer | D21H 21/12 |
| | | | | 516/13 |
| 9,089,132 B2 | * | 7/2015 | Lindner | A01N 25/30 |
| 2013/0084309 A1 | * | 4/2013 | Colonval | A61K 9/1075 |
| | | | | 424/283.1 |
| 2013/0338420 A1 | * | 12/2013 | Willey | C11D 3/30 |
| | | | | 588/318 |
| 2014/0171670 A1 | * | 6/2014 | Jenkins | C11B 13/00 |
| | | | | 554/19 |

FOREIGN PATENT DOCUMENTS

| | | | | |
|---|---|---|---|---|
| JP | 62153252 A | | 7/1987 | |
| WO | 2015009485 A1 | | 1/2015 | |
| WO | 2015057191 A1 | | 4/2015 | |
| WO | WO-2015057191 | * | 4/2015 | ............... C11B 1/10 |
| WO | 2016114983 A1 | | 7/2016 | |
| WO | WO-2016114983 A1 | * | 7/2016 | ............... C11B 1/10 |

OTHER PUBLICATIONS

International Preliminary Report on Patentability and Written Opinion for international Application No. PCT/US2018/012751, dated Jul. 30, 2019—9 pages.
International Search Report and Written Opinion for International Application No. PCT/US2018/012751, dated May 14, 2018—11 pages.

* cited by examiner

*Primary Examiner* — Yate' K Cutliff
(74) *Attorney, Agent, or Firm* — RatnerPrestia

(57) ABSTRACT

A process for making a surfactant composition is disclosed. In the process, a mixture comprising a sugar alcohol and fatty is formed. The mixture contains less than 5% by weight of water based on the total weight of the mixture. The mixture is reacted with an alkylene oxide to make a surfactant composition containing an alkoxylated sugar alcohol fatty acid ester and a polyalkylene glycol fatty acid ester. A surfactant composition and use of the surfactant composition to separate an oil phase and/or an aqueous phase from an emulsion is also disclosed.

11 Claims, No Drawings

SURFACTANT COMPOSITION

CROSS REFERENCE TO RELATED APPLICATIONS

This application is the National Stage filing of International Application No. PCT/US2018/012751, filed Jan. 8, 2018, and claims priority to U.S. Provisional Application No. 62/451,283, filed Jan. 27, 2017, which applications are hereby incorporated herein by reference in their entirety.

FIELD OF INVENTION

The present invention relates to a process for making a surfactant composition, the composition itself and the use of the composition.

BACKGROUND

Polysorbates are known as surfactant compositions. Polysorbates are made by a two-step process. In the first step, sorbitol is esterified with a fatty acid at a temperature high enough (over 200° C.) to cyclise the sorbitol and produce a sorbitan fatty acid ester. In the second step, this sorbitan ester is alkoxylated with an alkylene oxide. This known two-step process reduces or prevents contact between unreacted fatty acid and unreacted alkylene oxide to reduce the amount of side reaction of alkylene oxide and fatty acid when making the product. This two-step process results in the polysorbate comprising lower amounts of alkoxylated fatty acid. The alkoxylated fatty acid may be in the form of polyalkylene glycol fatty acid ester.

For many years, polysorbates have been made by this two-step process. It its understood that a two-step process was used because it was considered desirable to maximise the amount of alkoxylated sorbitan fatty acid ester in the polysorbate and minimise the amount of polyalkylene glycol fatty acid ester.

There remains a need for an improved process to make a surfactant composition and for a surfactant composition with one or more improved properties.

SUMMARY OF THE INVENTION

The invention is based on the recognition by the applicant that starting materials comprising a sugar alcohol, a fatty acid and an alkylene oxide can all be reacted together simultaneously in a single step to form a surfactant composition. Previously, it was believed that at least two steps were required to minimise the amount of alkoxylated fatty acid produced. The surfactant composition of the invention comprises an alkoxylated sugar alcohol fatty acid ester and a significant amount of alkoxylated fatty acid in the form of polyalkylene glycol fatty acid ester.

Surprisingly, the surfactant composition of the invention has one or more improved performance aspects than a comparative polysorbate. In particular, the surfactant composition has a better performance than a polysorbate as a corn oil separation additive for separating corn oil from a stillage in a corn to ethanol production process. This improved performance is unexpected since it has previously been believed that the side reaction of fatty acid and alkylene oxide would produce undesirable amounts of polyalkylene glycol fatty acid ester which would impede one or more surfactant properties of the composition. The single reaction step of the process of the invention also requires less energy than the known two-step process. Less energy is required since only one significant heating step is required instead of two and/or a lower temperature may be used in the heating step.

Viewed from a first aspect, the present invention provides a process for making a surfactant composition, wherein the process uses reactants which comprise a sugar alcohol, a fatty acid and an alkylene oxide and wherein the process comprises the steps of:
  a. forming a mixture comprising the sugar alcohol and the fatty acid, wherein the mixture comprises less than 5% water by weight based on the total weight of the mixture;
  b. reacting the mixture with an alkylene oxide to make a surfactant composition comprising an alkoxylated sugar alcohol fatty acid ester and a polyalkylene glycol fatty acid ester.

Viewed from a second aspect, the present invention provides a surfactant composition obtainable by a process according to the first aspect.

Viewed from a third aspect, the present invention provides a surfactant composition comprising at least 40 wt % of alkoxylated sugar alcohol fatty acid ester and at least 10 wt % of polyalkylene glycol fatty acid ester, wherein the polyalkylene glycol fatty acid ester comprises mono-ester and di-ester and wherein the weight ratio of mono-ester to di-ester of polyalkylene glycol fatty acid ester in the surfactant composition is from 3:1 to 1:3.

Viewed from a fourth aspect, the present invention provides a method of separating an oil phase and/or an aqueous phase from an emulsion comprising the oil phase and the aqueous phase, wherein the method comprises adding a separation additive to the emulsion and performing at least one separation step, wherein the separation additive comprises a surfactant composition according the second or third aspect.

Viewed from a fifth aspect, the present invention provides a method of forming an emulsion comprising an aqueous phase and an oil phase wherein the method comprises adding a surfactant composition according to the second or third aspect to the aqueous phase and/or the oil phase and combining the aqueous phase and the oil phase to form the emulsion.

Viewed from a sixth aspect, the present invention provide the use of a surfactant composition according to the second or third aspect to separate an oil phase and/or an aqueous phase from an emulsion comprising the oil phase and the aqueous phase.

Viewed from a seventh aspect, the present invention provides the use of a surfactant composition according the second or third aspect to separate corn oil from a stillage produced during a corn to ethanol production process.

Viewed from an eighth aspect, the present invention provides a formulation comprising a surfactant composition according to the second or third aspect wherein the formulation is selected from the group consisting of agrochemical, pharmaceutical, cosmetic, personal care, detergent, home care, textile finishing, food, lubricant, mining, oil industry, water treatment, coating, adhesive, plastic, paint, ink and dye formulations.

Any aspect of the invention may include any of the features described herein with regard to that aspect of the invention or any other aspects of the invention.

DETAILED DESCRIPTION OF THE INVENTION

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

Many of the chemicals which may be used to produce the surfactant composition of the invention are obtained from natural sources. Such chemicals typically include a mixture of chemical species due to their natural origin. Due to the presence of such mixtures, various parameters defined herein can be an average value and may be non-integral.

Sugar Alcohol

A sugar alcohol as defined herein is an organic compound which has at least 4 carbon atoms and at least 4 hydroxyl groups and which is derived from a sugar.

The sugar alcohol may have from 4 to 8 carbon atoms, preferably from 4 to 7, more preferably from 4 to 6.

The sugar alcohol may have from 4 to 8 hydroxyl groups, preferably from 4 to 7, more preferably from 4 to 6.

The sugar alcohol may have at least one primary hydroxyl group, preferably at least 2. The sugar alcohol may have two primary hydroxyl groups. The sugar alcohol may have at most 4 primary hydroxyl groups, preferably at most 3.

The sugar alcohol may have at least two secondary hydroxyl groups, preferably at least 3, more preferably at least 4. The sugar alcohol may have four secondary hydroxyl groups. The sugar alcohol may have at most 6 secondary hydroxyl groups, preferably at most 5.

The sugar alcohol may have an equal number of carbon atoms and hydroxyl groups.

The sugar alcohol may be selected from tetrols, pentols, hexols, heptols, or octols. Preferably the sugar alcohol is a hexol.

The sugar alcohol may not comprise any cyclic groups. The sugar alcohol may not comprise any branched carbon groups. Preferably the sugar alcohol has a linear carbon chain.

The sugar alcohol may have the molecular formula $C_aH_{2a+2}O_a$. The value a may be from 4 to 8, preferably from 4 to 7, more preferably from 4 to 6.

The sugar alcohol may comprise one or more of erythritol (4-carbon), threitol (4-carbon), arabitol (5-carbon), xylitol (5-carbon), ribitol (5-carbon), mannitol (6-carbon), sorbitol (6-carbon), galactitol (6-carbon), fucitol (6-carbon), and iditol (6-carbon). The sugar alcohol may be selected from the group consisting of, erythritol, threitol, arabitol, xylitol, ribitol, mannitol, sorbitol, galactitol, fucitol and iditol and mixtures thereof.

The sugar alcohol may comprise sorbitol, preferably consists of sorbitol. Preferably the sugar alcohol does not comprise sorbitan. Preferably the sugar alcohol is sorbitol.

Fatty Acid

The fatty acid may be a mono-carboxylic acid. The fatty acid may comprise a carboxylic group and a hydrocarbyl group. The fatty acid may comprise, preferably consists of, a linear or branched hydrocarbyl group bonded to a carboxylic group.

The fatty acid may be a mixture of species. The fatty acid may comprise at least two mono-carboxylic acids.

The fatty acid may be linear or branched, preferably linear. The fatty acid may be saturated or unsaturated. The fatty acid may be saturated and branched. Unsaturated fatty acids are preferred. The unsaturated fatty acids may be mono-unsaturated (with 1 C=C double bond) or poly-unsaturated (with multiple C=C double bonds). Mono-unsaturated fatty acids are preferred.

The fatty acid may have at least 6 carbon atoms, preferably at least 8 carbon atoms, more preferably at least 9 carbon atoms, particularly at least 10 carbon atoms, and especially at least 12 carbon atoms. The fatty acid may have at most 24 carbon atoms, preferably at most 22 carbon atoms, and particularly at most 20 carbon atoms. Preferably the fatty acid has from 6 to 24, more preferably 8 to 22, and particularly 10 to 20 carbon atoms.

The process of the invention is particularly advantageous when used with a fatty acid having less than 12 carbon atoms. This is because the known two-step process to make a polysorbate surfactant comprises a first step in which sorbitol is esterified with a fatty acid at a temperature high enough to produce a sorbitan fatty acid ester. This high temperature is at least 200° C. At this temperature, a fatty acid having less than 12 carbon atoms will tend to evaporate and cause difficulty in performing the reaction process without significant material loss. Without being bound by theory this may explain why lauric acid is the shortest fatty acid used in common polysorbates such as Polysorbate 20 (polyoxyethylene (20) sorbitan monolaurate), Polysorbate 40 (polyoxyethylene (20) sorbitan monopalmitate), Polysorbate 60 (polyoxyethylene (20) sorbitan monostearate) and Polysorbate 80 (polyoxyethylene (20) sorbitan monooleate). However, the process of the present invention is preferably performed at a temperature of less than 200° C. and so is suitable for used with a fatty acid having less than 12 carbon atoms. In view of this lower temperature, the fatty acid may have at most 11 carbon atoms, preferably at most 10. The fatty acid may have at least 4 carbon atoms, preferably at least 5 carbon atoms, more preferably at least 6 carbon atoms.

Suitable saturated fatty acids may be selected from butanoic acid, pentanoic acid, hexanoic (caproic) acid, heptanoic acid, octanoic (caprylic) acid, nonanoic (pelargonic) acid, decanoic (capric) acid, undecanoic acid, dodecanoic (lauric) acid, tridecanoic acid, tetradecanoic (myristic) acid, 2-ethyl hexanoic acid, trimethylhexanoic acid, trimethylnonanoic acid, hexadecanoic (palmitic) acid, octadecanoic (stearic) acid, isostearic acid, eicosanoic acid, docosanoic acid and mixtures thereof. Preferred saturated fatty acids may be selected from pelargonic, lauric, palmitic, stearic, isostearic acids and mixtures thereof, particularly pelargonic acid.

Suitable unsaturated fatty acids may be selected from oleic acid, ricinoleic acid, linoleic acid, linolenic acid and mixtures thereof. Oleic acid is a preferred unsaturated fatty acid.

The fatty acid may comprise at least 10 wt % unsaturated species, preferably at least 20 wt %, particularly at least 30 wt %, desirably at least 40 wt %. The fatty acid may comprise at most 80 wt % unsaturated species, preferably at most 70 wt %, particularly at most 60 wt %.

The fatty acid may comprise at least 10 wt % mono-unsaturated species, preferably at least 20 wt %, particularly at least 30 wt %, desirably at least 40 wt %. The fatty acid may comprise at most 80 wt % mono-unsaturated species, preferably at most 70 wt %, particularly at most 60 wt %.

The fatty acid preferably comprises a mixture of species obtained from a natural source. Fatty acids derived from plant sources are preferred. Suitable natural sources include those selected from the group consisting of canola oil, castor oil, soybean oil, cottonseed oil, corn oil, tall oil, palm kernel oil, coconut oil, rapeseed oil, high erucic rapeseed oil, tallow oil and mixtures thereof. Preferably the fatty acid comprises oleic acid.

The fatty acid may be in the form of a fatty acid alkyl ester. The fatty acid alkyl ester may be a C1 to C8 alkyl ester, preferably a C1 to C4 alkyl ester, particularly a methyl ester and/or ethyl ester, desirably a methyl ester.

Alkylene Oxide

The alkylene oxide groups of the alkoxylated sugar alcohol fatty acid ester are typically present as polyalkylene oxide chains of the formula: $—(C_rH_{2r}O)_n—$ where n is the number of alkylene oxide groups in the chain and r is 2, 3 or 4, preferably 2 or 3, i.e. an ethyleneoxy ($—C_2H_4O—$) or propyleneoxy ($—C_3H_6O—$) group. Preferably the alkoxylated sugar alcohol fatty acid ester comprises at least one polyalkylene oxide chain. The polyalkylene oxide chain may comprise the same alkylene oxide groups or different alkylene oxide groups, preferably the same alkylene oxide groups. Preferably, the polyalkylene oxide chain is a homopolymeric ethylene oxide chain. The polyalkylene oxide chain may be a homopolymeric propylene oxide chain. The polyalkylene oxide chain may be a block or random copolymer chain containing both ethylene oxide and propylene oxide residues. Where co-polymeric chains of ethylene and propylene oxide units are used, the molar proportion of ethylene oxide units used is suitably at least 50 mol %, preferably at least 70 mol %, more preferably at least 80 mol %, and particularly at least 90 mol %. Preferably the alkylene oxide is ethylene oxide.

The average number of alkylene oxide groups in each polyalkylene oxide chain of the alkoxylated sugar alcohol fatty acid ester, i.e. the value of each parameter n, is suitably in the range from 1 to 20, preferably 4 to 16, more preferably 6 to 16, particularly 7 to 15, and especially 8 to 12. The value of the index n is an average value, which includes statistical variation in the chain length.

The total number of alkylene oxide, preferably ethylene oxide, groups in the alkoxylated sugar alcohol fatty acid ester (i.e. the average number of alkylene oxide groups in each polyalkylene oxide chain (parameter n)×the number of chains) may be at least 10, preferably at least 20, particularly at least 25, desirably at least 30 and especially at least 40. The total number of alkylene oxide, preferably ethylene oxide, groups in the alkoxylated sugar alcohol fatty acid ester may be at most 120, preferably at most 90, particularly at most 80, desirably at most 75 and especially at most 70.

The molar ratio of alkylene oxide, preferably ethylene oxide, to sugar alcohol which is used in the process of the invention (e.g. used in step b.) may be at least 10:1, preferably at least 20:1, particularly at least 25:1, desirably at least 30:1 and especially at least 40:1. The molar ratio of alkylene oxide, preferably ethylene oxide, to sugar alcohol which is used in the process may be at most 120:1, preferably at most 90:1, particularly at most 80:1, desirably at most 75:1 and especially at most 70:1. Preferably the molar ratio of alkylene oxide to sugar alcohol which is reacted in step b. is from 40:1 to 80:1.

The presence of $^{14}C$, the content of biomaterial, the content of biocarbon or the content of organic carbon of renewable origin of a material may be determined on the basis of standards ASTM D 6866 (ASTM D 6866-06) and ASTM D 7026 (ASTM D 7026-04).

Ethylene oxide (EO) and/or propylene oxide (PO) used in the process of the invention may be produced at a prior stage from ethylene and/or propylene; the ethylene and/or the propylene may be derived from renewable raw materials, such as biomaterials, for example bio-ethanol.

The ethylene oxide and/or propylene oxide which is used in the process of the invention and is derived from such biomaterials may therefore comprise $^{14}C$, which may be demonstrated using standards ASTM D 6866 or ASTM D 7026.

Surfactant Composition

The surfactant composition of the invention comprises an alkoxylated sugar alcohol fatty acid ester and a polyalkylene glycol fatty acid ester. The surfactant composition may be obtainable, and is preferably obtained by a process according to the invention.

The surfactant composition may comprise at least 30 wt % alkoxylated sugar alcohol fatty acid ester, preferably at least 40 wt %, particularly at least 50 wt %, desirably at least 60 wt %. The surfactant composition may comprise at most 90 wt % alkoxylated sugar alcohol fatty acid ester, preferably at most 80 wt %, particularly at most 75 wt %.

The alkoxylated sugar alcohol fatty acid ester may comprise mono-ester (the mono-ester having one fatty acid group esterified to the alkoxylated sugar alcohol). The alkoxylated sugar alcohol fatty acid ester may comprise mono-ester and di-ester (the di-ester having two fatty acid groups esterified to the alkoxylated sugar alcohol). The alkoxylated sugar alcohol fatty acid ester may comprise mono-ester, di-ester and tri-ester. The weight ratio of mono-ester to di-ester of alkoxylated sugar alcohol fatty acid ester in the surfactant composition may be from 3:1 to 1:3, preferably from 2:1 to 1:2, more preferably from 1.5:1 to 1:1.5. The weight ratio of mono-ester to tri-ester may be from 3:1 to 1:3, preferably from 2:1 to 1:2, more preferably from 1.5:1 to 1:1.5. The weight ratio of di-ester to tri-ester may be from 3:1 to 1:3, preferably from 2:1 to 1:2, more preferably from 1.5:1 to 1:1.5.

The surfactant composition comprises at least 5 wt % polyalkylene glycol fatty acid ester, preferably at least 10 wt %, particularly at least 15 wt %. The surfactant composition may comprise at most 50 wt % polyalkylene glycol fatty acid ester, preferably at most 40 wt %, particularly at most 30 wt %, desirably at most 24 wt %, especially at most 22 wt %.

The polyalkylene glycol fatty acid ester may comprise mono-ester (the mono-ester having one fatty acid group esterified to the polyalkylene glycol). The polyalkylene glycol fatty acid ester may comprise mono-ester and di-ester (the di-ester having two fatty acid groups esterified to the polyalkylene glycol). The weight ratio of mono-ester to di-ester of polyalkylene glycol fatty acid ester in the surfactant composition may be from 3:1 to 1:3, preferably from 2:1 to 1:2, more preferably from 1.8:1 to 1:1.8, desirably from 1.6:1 to 1:1.6.

The chemical composition of the surfactant composition (including the wt % and/or weight ratio of species) may be determined using MALDI Mass Spectrometry (MMS) as described herein.

The surfactant composition may comprise at most 8 wt % water, preferably at most 6 wt %, particularly at most 4 wt %, desirably at most 2 wt %, especially at most 1 wt %. The surfactant composition may comprise at least 0.01 wt % water. The amount of water may be determined by Karl Fischer titration.

The surfactant composition may comprise no sorbitan derivatives, preferably no sorbitan esters, particularly no alkoxylated sorbitan esters.

The surfactant composition preferably has an acid value (measured as described herein) of at most 20 mg KOH/g, more preferably at most 10 mg KOH/g, particularly at most 5 mg KOH/g, and especially at most 1 mg KOH/g. The surfactant composition may have an acid value (measured as described herein) of at least 0.01 mg KOH/g, preferably at least 0.05 mg KOH/g, particularly at least 0.1 mg KOH/g.

The surfactant composition preferably has a hydroxyl value (measured as described herein) of at most 200 mg KOH/g, more preferably at most 190 mg KOH/g, particularly at most 180 mg KOH/g. The surfactant composition may have a hydroxyl value (measured as described herein) of at least 50 mg KOH/g, preferably at least 60 mg KOH/g, particularly at least 70 mg KOH/g.

The surfactant composition preferably has a saponification value (measured as described herein) of at most 200 mg KOH/g, more preferably at most 150 mg KOH/g, particularly at most 100 mg KOH/g. The surfactant composition may have a saponification value (measured as described herein) of at least 20 mg KOH/g, preferably at least 40 mg KOH/g, particularly at least 50 mg KOH/g.

As used herein, the term 'HLB' means the hydrophilic/lipophilic balance of a molecule. The HLB value of a molecule is a measure of the degree to which it is hydrophilic or lipophilic, determined by calculating values for the different regions of the molecule. An HLB value of 0 corresponds to a completely lipophilic/hydrophobic molecule, and a value of 20 corresponds to a completely hydrophilic/lipophobic molecule.

The HLB value may be measured experimentally by comparison of the solubility behaviour of the composition being tested with the solubility behaviour of standard compositions of known HLB. It may also be calculated theoretically, for example by using Griffin's method as is known in the art.

The surfactant composition may have an HLB value of at least 4, preferably at least 5, particularly at least 6. The surfactant composition may have an HLB value of at most 18, preferably at most 17, particularly at most 16.

The surfactant composition may have an HLB value of from 6 to 9. The surfactant composition may be oil soluble.

The surfactant composition may have an HLB value of from 12 to 17, preferably from 13 to 16. The surfactant composition may be water soluble.

The surfactant composition may have a Gardner color (measured as described herein) of at least 1, preferably at least 1.5. The surfactant composition may have a Gardner color of at most 8, preferably at most 7, particularly at most 6, desirably at most 5 and especially at most 4.5. The surfactant composition may have this Gardner color without the use of a bleaching process and/or bleaching agent. The surfactant composition may not comprise a bleaching agent. The process of the invention may not comprise a bleaching step. A lower Gardner color may be achieved in the surfactant composition due to the lower temperatures used in the process of the invention. A lower Gardner color may be desirable in some uses of the surfactant composition e.g. in personal care formulations.

The surfactant composition may be a separation or demulsifying additive, preferably a separation additive. Alternatively, the surfactant composition may be an emulsifier.

Process

The process of the invention uses reactants which comprise a sugar alcohol, a fatty acid and an alkylene oxide. The reactants may consist essentially of a sugar alcohol, a fatty acid and an alkylene oxide. Preferably the reactants consist of a sugar alcohol, a fatty acid, an alkylene oxide, water and a catalyst. Preferably the catalyst comprises caustic soda.

The process of the invention comprises the steps of:
a. forming a mixture comprising a sugar alcohol and a fatty acid, wherein the mixture comprises less than 5 wt % water based on the total weight of the mixture; and
b. reacting the mixture with an alkylene oxide to make a surfactant composition comprising an alkoxylated sugar alcohol fatty acid ester and a polyalkylene glycol fatty acid ester.

The amount of water in the mixture comprising a sugar alcohol and a fatty acid formed during step a. is relevant. Unexpectedly, it has been found that a mixture which comprises less than 5 wt % water based on the total weight of the mixture may be required so that an improved surfactant composition is made in step b. Without being bound by theory it is believed that more than 5 wt % water will result in undesirable amounts of polyalkylene glycol being made in step b. Polyalkylene glycol does not have the desired surfactant properties. The amount of water may be determined by Karl Fischer titration.

The sugar alcohol may require a minimum water content to allow it to be processable at room temperature. Once the sugar alcohol is included in the mixture comprising a sugar alcohol and a fatty acid formed in step a., it may no longer require this minimum water content, particularly if the mixture is heated to an elevated temperature as described below.

A mixture comprising less than 5 wt % water may be achieved in step a. by various methods. One or more reactants having low water content may be used and/or the mixture may be heated. Preferably the mixture is heated to lower the water content. Preferably the mixture is heated before or during step a. to reduce the amount of water it contains. Preferably step a. comprises heating the mixture. Before and/or during step a., preferably during step a., the mixture may be heated to a temperature of at least 70° C., preferably at least 80° C., particularly at least 90° C., desirably at least 100° C. Step a. may occur at a temperature of at least 70° C., preferably at least 80° C., particularly at least 90° C., desirably at least 100° C. Step a. may occur at a temperature of at most 190° C., preferably at most 180° C., particularly at most 170° C., desirably at most 165° C.

The mixture of the sugar alcohol and the fatty acid formed in step a. may comprise less than 4 wt % water, preferably less than 3 wt % water, particularly less than 2 wt % water, desirably less than 1 wt % water and especially less than 0.5 wt % water based on the total weight of the mixture. The mixture of the sugar alcohol and the fatty acid formed in step a. may comprise at least 0.01 wt % water, preferably at least 0.015 wt % water, particularly at least 0.02 wt % water. The amount of water may be determined by Karl Fischer titration.

Step a. may be performed over a period of time sufficient to achieve the desired amount of water in the mixture. Step a. may occur for a period of at least 10 minutes, preferably at least 20 minutes, particularly at least 30 minutes, desirably at least 40 minutes, especially at least 50 minutes. Step a. may occur for a period of at most 5 hours, preferably at most 4 hours, particularly at most 3 hours, desirably at most 2 hours, especially at most 1.5 hours.

The temperature at which step b. is performed is significant. A temperature above 200° C. may be disadvantageous. Such a temperature may evaporate a significant amount of the fatty acid in the mixture and/or may cyclise the sugar alcohol. For example, at temperatures above 200° C., sorbitol may cyclise to sorbitan. Evaporation of fatty acid and/or cyclisation of sugar alcohol may be undesirable. Step b. may occur at a temperature of at least 100° C., preferably at least 110° C., particularly at least 120° C., desirably at least 130° C. Step b. may occur at a temperature of at most 200° C., preferably at most 190° C., particularly at most 180° C. Preferably, step b. occurs at a temperature in the range from 100° C. to 200° C. A lower temperature may be advantageous over a higher temperature due to a lower energy requirement to reach the temperature and a lower tendency for discolouration (e.g. darkening) of the reactant mixture and/or product at the lower temperature when compared with the higher temperature. The process of the invention, preferably steps a. and b., may occur at a temperature of at most 200° C., preferably from 100° C. to 200° C.

The molar ratio of alkylene oxide, preferably ethylene oxide, to sugar alcohol which is used in step b. may be at least 10:1, preferably at least 20:1, particularly at least 25:1, desirably at least 30:1 and especially at least 40:1. The molar ratio of alkylene oxide, preferably ethylene oxide, to sugar alcohol which is used in step b. may be at most 120:1, preferably at most 90:1, particularly at most 80:1, desirably at most 75:1 and especially at most 70:1.

The alkylene oxide used in step b. may be ethylene oxide and/or propylene oxide, preferably ethylene oxide. Where ethylene oxide and propylene oxide are used, the molar proportion of ethylene oxide units used is suitably at least 50 mol % of the total alkylene oxide units used, preferably at least 70 mol %, more preferably at least 80 mol %, and particularly at least 90 mol %.

Step b. may be performed over a period of time sufficient to achieve the desired degree of alkoxylation. Step b. may occur for a period of at least 0.5 hours, preferably at least 1 hour, particularly at least 1.5 hours. Step b. may occur for a period of at most 8 hours, preferably at most 6 hours, particularly at most 5 hours, desirably at most 4 hours, especially at most 3 hours.

The process of the invention may comprise a step c. of removing residual alkylene oxide from the surfactant composition. Step c. may comprise gas sparging, preferably nitrogen sparging. Step c. may be performed over a period of time sufficient to remove substantially all residual alkylene oxide. Step c. may occur for a period of at least 10 minutes, preferably at least 20 minutes. Step c. may occur for a period of at most 4 hours, preferably at most 3 hours, particularly at most 2 hours. The amount of residual alkylene oxide in the surfactant composition may be at most 10 ppm based on the total weight of the surfactant composition, preferably at most 5 ppm, particularly at most 2 ppm, desirably at most 1 ppm.

The process of the invention may comprise a step d. of neutralising the surfactant composition. Step d. may comprise neutralising by adding an acid, preferably phosphoric acid to the surfactant composition. After neutralisation, the surfactant composition may have acid and/or hydroxyl values as described herein.

The process of the invention may not comprise a bleaching step. The surfactant composition produced by the process may have a suitable Gardner color without the need for a bleaching step. The surfactant composition may not comprise a bleaching agent, preferably does not comprise a peroxide bleaching agent. The process may not comprise the addition of a bleaching agent, preferably does not comprise the addition of a peroxide bleaching agent.

Applications of the Surfactant Composition

A method of separating an oil phase and/or an aqueous phase from an emulsion comprising the oil phase and the aqueous phase may comprise adding a separation additive to the emulsion and performing at least one separation step, wherein the separation additive comprises the surfactant composition of the invention. Preferably the oil phase comprises corn oil and the emulsion is a stillage produced during a corn to ethanol production process.

The surfactant composition of the invention may be used to separate an aqueous phase and an oil phase. Preferably the invention provides the use of the surfactant composition to separate an oil phase and/or an aqueous phase from an emulsion comprising the oil phase and the aqueous phase.

The aqueous phase and the oil phase may be present in a corn to ethanol production process. The aqueous phase and the oil phase may be present in a stillage. The oil phase may comprise corn oil.

The aqueous phase and the oil phase may be present in a hydrocarbon production process. The aqueous phase and the oil phase may be present in a crude oil. The oil phase may comprise a hydrocarbon, preferably consists essentially of a hydrocarbon.

The aqueous phase and the oil phase may be present in a water treatment process. The aqueous phase and the oil phase may be present in an effluent. The oil phase may be a water contaminant, for example a hydrocarbon based water contaminant.

A method of forming an emulsion comprising an aqueous phase and an oil phase may comprises adding the surfactant composition of the invention to the aqueous phase and/or the oil phase and combining the aqueous phase and the oil phase to form the emulsion. The surfactant composition may be used to emulsify an aqueous phase and an oil phase. The aqueous phase and the oil phase may be present in a cosmetic or personal care product.

The invention may provide the use of the surfactant composition as an additive to an agrochemical, pharmaceutical, cosmetic, personal care, detergent, home care, textile finishing, food, lubricant, mining, oil industry, water treatment, coating, adhesive, plastic, paint, ink or dye product or corn oil stillage, preferably the use as an additive to an agrochemical, cosmetic, personal care, detergent, home care, textile finishing product, or corn oil stillage, particularly as an additive to corn oil stillage.

The invention may provide the use of the surfactant composition in a fiber finishing process, emulsion polymerisation process or corn to ethanol process, preferably the use in a corn to ethanol process.

Preferably the invention provides the use of the surfactant composition to separate corn oil from a stillage produced during a corn to ethanol production process.

A formulation comprising the surfactant composition of the invention may be selected from the group consisting of agrochemical, pharmaceutical, cosmetic, personal care, detergent, home care, textile finishing, food, lubricant, mining, oil industry, water treatment, coating, adhesive, plastic, paint, ink and dye formulations, preferably selected from the group consisting of agrochemical, cosmetic, personal care, textile finishing, food, lubricant, oil industry and water treatment formulations. A separation additive formulation may comprise the surfactant composition of the invention. The separation additive formulation may be used in corn to ethanol production, preferably in the treatment of stillage in a corn to ethanol process, particularly for the separation of corn oil.

The formulation may comprise at least 0.02 wt % of the surfactant composition based on the total weight of the formulation, preferably at least 0.05 wt %, more preferably at least 0.1 wt %, particularly at least 1 wt %. The formulation may comprise at most 10 wt % of the surfactant composition based on the total weight of the formulation, preferably at most 5 wt %, more preferably at most 2 wt %, particularly at most 1 wt %.

The surfactant composition of the invention may have improved performance in separating an oil phase and an aqueous phase when compared with an equivalent amount, preferably weight, of a polysorbate, preferably polysorbate 80. The surfactant composition may separate more oil phase, preferably corn oil, from a sample than an equivalent amount, preferably weight, of a polysorbate, preferably polysorbate 80.

EXAMPLES

It will be understood that all test procedures and physical parameters described herein have been determined at atmospheric pressure and room temperature (i.e. about 20° C.), unless otherwise stated herein, or unless otherwise stated in the referenced test methods and procedures. All parts and percentages are given by weight unless otherwise stated.

In this specification the following test methods have been used:

i) Corn Oil Separation Test (COST)

Thin stillage samples obtained from corn ethanol plants were stored in a refrigerator to keep from being spoiled. Prior to the test, a stillage sample was taken out of the refrigerator and heated to 82° C. (180 F) in an oven. 40 ml of the pre-heated stillage sample was added to a 50 ml centrifuge tube, and 400 ppm of surfactant composition was added into the sample. The sample was centrifuged at 7,000 rpm for 3 minutes. The height of the clear oil layer was measured (in mm) with a ruler.

ii) Acid Value

Acid value was determined by using ASTM D1980-87 (Standard test method for acid value of fatty acids and polymerised fatty acids).

iii) Hydroxyl Value

Hydroxyl value was measured by using ASTM D1957-86 (Standard test method for hydroxyl value of fatty oils and acids).

iv) Saponification Value

Saponification value was measured by using ASTM D5558 (Standard test method for vegetable and animal fats).

v) Water Content

Water content was measured by Karl Fischer titration using an automatized Karl Fischer titrator.

vi) Gardner Colour

The Gardner color of a sample was measured automatically using a BYK LCS IV Colorimeter (Spectrometer) available from BYK-Gardner GmbH. The test method was performed following the instructions in the BYK LCS IV Colorimeter instruction manual.

vvi) Chemical Composition by MALDI Mass Spectrometry (MMS)

The chemical composition of the surfactant composition was determined by Maldi-MS (MMS). Three solutions were prepared. One contained the surfactant composition sample in chloroform at a volume concentration of 1%. The second contained dithranol, a common matrix used for MALDI mass spectrometry, dissolved in chloroform at a volume concentration of 1%. The third contained potassium bromide dissolved in methanol at a volume concentration of 1%. Portions of the three solutions were combined in volume ratios of 100 parts matrix solution, 20 parts sample solution, and 1 part potassium bromide solution. A one-microliter sample of this mixture was spotted onto a MALDI plate, upon which it dried immediately. The MALDI spectrum was acquired using a Bruker Autoflex speed MALDI mass spectrometer, operated in reflector mode. Immediately prior to collection of the spectrum of the sample, the mass scale of the instrument was calibrated using a mixture of peptides provided by Bruker for this purpose. The spectrum was imported into the data analysis program Polymerix (Ver. 3.0.0) from Sierra Analytics, Inc. Peaks were assigned based on knowledge of the reaction chemistry and best fits to the data. The data was analysed to identify the major chemical species which were present in the composition and assign weight proportions to each species.

The invention is illustrated by the following non-limiting examples.

Example 1

A surfactant composition (SC1) according to the invention was produced using the materials listed in Table 1.

TABLE 1

| Raw Material | Weight, g | Weight % | Molar ratio |
|---|---|---|---|
| 80 wt % Sorbitol in 20 wt % water | 68.9 | 3.7 (on dry basis) | 1 (on dry basis) |
| Oleic Acid | 512.9 | 34.2 | 6 |
| Ethylene Oxide | 932.0 | 62.1 | 70 |
| Total | 1513.8 (1500 on dry basis i.e. excluding water) | 100 | |
| 50 wt % Caustic Soda in 50 wt % water | 0.8 | ~0.05 | |

The process for making the surfactant composition comprised the following steps:

1. Charge fatty acid, sorbitol (80%), and catalyst (caustic soda, 50%) into a 2-L pressurized reactor at ambient temperature.
2. With agitation and nitrogen sweep on, heat the reactor to 160° C. slowly. As the heating is applied, pull vacuum to remove water.
3. Once the residual water is reduced to below 0.2 wt % at temperature range of 160-165° C., stop nitrogen sweep.
4. Start feeding ethylene oxide into the reactor at the temperature range of 150-165° C. The ethylene oxide feeding rate needs to be controlled so the reactor pressure will not exceed 50 psig (or the safety limit of the reactor).
5. Once all the ethylene oxide is added, allow the reactor pressure to decrease at the reaction temperature range of 160-165° C. After the pressure drop reaches a steady low rate, hold the reaction for another 2 hours.
6. Cool the reactor to 120° C. Apply nitrogen sparge for 10-20 minutes to remove the residual ethylene oxide.
7. Cool the reaction to 60-65° C., neutralize the product with phosphoric acid.
8. Discharge the product.

The product of this process will be known as Surfactant Composition 1 (SC1). SC1 was analysed using the Test Methods described herein and the results of the tests are given in Table 2. The chemical composition of SC1 was determined by MALDI Mass Spectrometry (MMS) as described herein and the results are given in Table 3. The calculated HLB of SC1 is 13.5 (calculated by Griffin's method).

TABLE 2

| Test Sample | SC1 |
|---|---|
| Hydroxyl Value, mg KOH/g | 134.6 |
| Acid Value, mg KOH/g | 0.25 |
| SAP Value, mg KOH/g | 67.2 |
| Water content wt % | 0.25 |
| Gardner Color | 3.6 |

TABLE 3

| Chemical composition of SC1 determined by MMS | Wt % |
|---|---|
| PEG | 3.2 |
| PEG-monooleate | 11.6 |
| PEG-dioleate | 7.5 |
| sorbitol-EOx | 7.4 |
| sorbitol-EOx-oleate | 18.4 |
| sorbitol-EOx-dioleate | 21.7 |
| sorbitol-EOx-trioleate | 17.6 |
| sorbitol-EOx-tetraoleate | 6.4 |
| sorbitol-EOx-pentaoleate | 5.9 |

Example 2

A surfactant composition (SC2) according to the invention was produced using the materials listed in Table 4.

TABLE 4

| Raw Material | Weight, g | Weight % | Molar ratio |
|---|---|---|---|
| 80 wt % Sorbitol in 20 wt % water | 81.1 | 4.3 (on dry basis) | 1 (on dry basis) |
| Pelargonic Acid | 337.8 | 22.5 | 6 |
| Ethylene Oxide | 1097.3 | 73.2 | 70 |
| Total | 1516.2 (1500 on dry basis i.e. excluding water) | 100 | |
| 45 wt % Caustic Soda in 55 wt % water | 0.8 | ~0.05 | |

The process for making the surfactant composition comprised the following steps:

1. Charge pelargonic acid, sorbitol (80%) and catalyst (caustic soda, 45%) into a 2 litre pressurised reactor at ambient temperature.
2. With agitation, heat the reactor to 110° C. slowly; sparge vessel with nitrogen 3 times (40 psi to 10 psi).
3. Once at temperature, pull vacuum to remove water. Maintain full vacuum and hold at 110° C. for 1 hour. Break vacuum with nitrogen and pull sample for wt % water content.
4. Once the residual water is reduced to below 0.1 wt %, move on to next step.
5. Heat the reactor to 160° C., and start to feed ethylene oxide (EO). The ethylene oxide feeding rate needs to be controlled so the reactor pressure will not exceed 50 psig (or the safety limit of the reactor).
6. Once all the ethylene oxide is added, allow the reactor pressure to decrease at the reaction temperature range of 160-165° C. Hold the reaction for 1-2 hours.
7. Cool the reactor to 110° C. Once at temperature, pull vacuum to remove the residual ethylene oxide. Maintain full vacuum and strip EO at 110° C. for 1 hour. Break vacuum with nitrogen.
8. Cool the reaction to 60-65° C., pull sample to test pH for neutralization. Calculate and charge phosphoric acid (Target: pH 6-7) and agitate for 10-15 minutes. Once within pH range, discharge the product into beaker.

The product will be known as Surfactant Composition 2 (SC2). The calculated HLB of SC2 is 15.6 (calculated by Griffin's method).

Example 3

The product SC1 of Example 1 was used as a separation additive in the Corn Oil Separation Test (COST) described herein using two stillage samples (A & B) from a corn ethanol plant. The stillages were treated and the height of the clear oil layer was measured in millimetres (mm) for each stillage A & B. The average height was calculated, with a larger value indicating an improved separation performance. The COST results are shown in Table 5—it can be seen that SC1 gives an average clear oil layer height of 12.9 mm.

TABLE 5

| Test Sample | Stillage A, mm | Stillage B, mm | Average, mm |
|---|---|---|---|
| SC1 | 11.4 | 14.4 | 12.9 |

Example 4—Comparative

This is a Comparative Example not according to the invention. The procedure of Example 3 was repeated except that polysorbate 80 was used as the surfactant composition instead of SC1 of Example 1. The results are shown in Table 6. It can be seen by comparing Tables 5&6 that SC1 enabled more corn oil to be separated on average than Polysorbate 80, as shown by the average heights of the oil layers. Therefore SC1 has improved performance as a separation additive for corn oil than Polysorbate 80.

TABLE 6

| Test Sample | Stillage A, mm | Stillage B, mm | Average, mm |
|---|---|---|---|
| Polysorbate 80 | 11.6 | 11.2 | 11.4 |

The above examples indicate the improved properties of the surfactant composition of the present invention.

It is to be understood that the invention is not to be limited to the details of the above embodiments, which are described by way of example only. Many variations are possible.

The invention claimed is:

1. A process for making a surfactant composition from reactants consisting of a sugar alcohol, a fatty acid and an alkylene oxide, the process comprising:
   a. forming a mixture consisting of the sugar alcohol and the fatty acid at a temperature of at most 170° C., wherein the mixture comprises less than 5% water by weight based on the total weight of the mixture;
   b. reacting the mixture with the alkylene oxide at a temperature in a range of from 100° C. to 200° C. to make a surfactant composition comprising an alkoxylated sugar alcohol fatty acid ester and a polyalkylene glycol fatty acid ester.

2. The process according to claim 1 wherein the sugar alcohol is sorbitol.

3. The process according to claim 1 wherein the fatty acid has 6 to 24 carbon atoms.

4. The process according to claim 1 wherein the alkylene oxide is ethylene oxide.

5. The process according to claim 1 wherein the molar ratio of alkylene oxide to sugar alcohol which is reacted in step b. is from 40:1 to 80:1.

6. A surfactant composition obtained by the process according to claim 1.

7. A surfactant composition comprising at least 60 wt % and at most 80 wt % of a sorbitol ethoxylated fatty acid ester and at least 15 wt % and at most 22 wt % of a polyethylene glycol monooleate and dioleate fatty acid ester.

8. A method of separating an oil phase and/or an aqueous phase from an emulsion comprising the oil phase and the aqueous phase, wherein the method comprises adding a separation additive to the emulsion and performing at least one separation step, wherein the separation additive comprises the surfactant composition according to claim 6.

9. The method according to claim 8 wherein the oil phase comprises corn oil and the emulsion is a stillage produced during a corn to ethanol production process.

10. A method of forming an emulsion comprising an aqueous phase and an oil phase wherein the method comprises adding the surfactant composition according to claim 6 to the aqueous phase and/or the oil phase and combining the aqueous phase and the oil phase to form the emulsion.

11. A formulation comprising the surfactant composition according to claim 6, wherein the formulation is selected from the group consisting of agrochemical, pharmaceutical, cosmetic, personal care, detergent, home care, textile finishing, food, lubricant, mining, oil industry, water treatment, coating, adhesive, plastic, paint, ink and dye formulations.

* * * * *